US012571685B2

(12) United States Patent
Lin et al.

(10) Patent No.: US 12,571,685 B2
(45) Date of Patent: Mar. 10, 2026

(54) TEMPERATURE MEASURING DEVICE

(71) Applicant: RADIANT INNOVATION INC.,
Hsinchu County (TW)

(72) Inventors: Tseng-Lung Lin, Hsinchu County
(TW); I-Ling Chen, Hsinchu County
(TW); Chin-Hui Ku, Hsinchu City
(TW)

(73) Assignee: RADIANT INNOVATION INC.,
Hsinchu County (TW)

( * ) Notice: Subject to any disclaimer, the term of this
patent is extended or adjusted under 35
U.S.C. 154(b) by 473 days.

(21) Appl. No.: 18/324,996

(22) Filed: May 28, 2023

(65) Prior Publication Data

US 2024/0272009 A1     Aug. 15, 2024

(30) Foreign Application Priority Data

Feb. 9, 2023     (TW) .................................. 112104500

(51) Int. Cl.
| | |
|---|---|
| G01K 1/16 | (2006.01) |
| G01J 5/02 | (2022.01) |
| G01J 5/04 | (2006.01) |
| G01J 5/06 | (2022.01) |
| G01K 13/20 | (2021.01) |

(52) U.S. Cl.
CPC ............... G01K 1/16 (2013.01); G01J 5/021
(2013.01); G01J 5/049 (2013.01); G01J 5/06
(2013.01); G01K 13/20 (2021.01)

(58) Field of Classification Search
CPC .. G01K 1/16; G01J 5/021; G01J 5/049; G01J
5/06
See application file for complete search history.

(56) References Cited

U.S. PATENT DOCUMENTS

| | | | | |
|---|---|---|---|---|
| 4,854,730 A | * | 8/1989 | Fraden .................... | G01J 5/061 |
| | | | | 600/549 |
| 5,018,872 A | * | 5/1991 | Suszynski ............... | G01J 5/049 |
| | | | | 374/208 |
| 5,088,834 A | * | 2/1992 | Howe ..................... | G01J 5/021 |
| | | | | 374/E1.013 |

(Continued)

*Primary Examiner* — Laura Martin
*Assistant Examiner* — Philip L Cotey
(74) *Attorney, Agent, or Firm* — Li & Cai Intellectual
Property Office

(57)     ABSTRACT

A temperature measuring device is configured for measuring
a predetermined object by a temperature measurement mod-
ule. The temperature measuring device includes a device
main body having a hollow probe structure. An outer surface
of the hollow probe structure has a plurality of recessed
spaces recessed therefrom and a plurality of concave areas
respectively formed in the recessed spaces. When the hollow
probe structure of the device main body directly or indirectly
contacts the predetermined object, the recessed spaces of the
hollow probe structure are configured to reduce a heat
conduction path between the hollow probe structure and the
predetermined object. When the hollow probe structure of
the device main body directly or indirectly contacts the
predetermined object, the concave areas of the hollow probe
structure do not contact the predetermined object, so as to
reduce a heat exchange area between the hollow probe
structure and the predetermined object.

11 Claims, 12 Drawing Sheets

(56) References Cited

U.S. PATENT DOCUMENTS

| | | | | | |
|---|---|---|---|---|---|
| 7,108,419 | B2 * | 9/2006 | Harr | ........................... | G01J 5/02 |
| | | | | | 374/165 |
| 2002/0001335 | A1 * | 1/2002 | Lee | ........................ | G01K 13/20 |
| | | | | | 374/E13.002 |
| 2004/0028116 | A1 * | 2/2004 | Lin | ........................... | G01J 5/06 |
| | | | | | 374/E13.003 |
| 2006/0239329 | A1 * | 10/2006 | Tanaka | ..................... | G01K 1/18 |
| | | | | | 374/E7.018 |
| 2009/0116540 | A1 * | 5/2009 | Weng | ..................... | G01J 5/021 |
| | | | | | 374/209 |
| 2009/0168839 | A1 * | 7/2009 | Park | ........................ | G01K 13/02 |
| | | | | | 374/165 |
| 2010/0328090 | A1 * | 12/2010 | Hiramatsu | ............. | G01K 1/146 |
| | | | | | 340/687 |
| 2013/0006138 | A1 * | 1/2013 | Ho | ........................... | G01J 5/026 |
| | | | | | 600/549 |
| 2014/0334523 | A1 * | 11/2014 | Lin | ........................... | G01K 1/08 |
| | | | | | 374/163 |
| 2019/0017880 | A1 * | 1/2019 | Smith | ..................... | G01K 1/146 |
| 2020/0109993 | A1 * | 4/2020 | Lin | ........................... | G01J 5/049 |

* cited by examiner

TEMPERATURE MEASURING DEVICE

CROSS-REFERENCE TO RELATED PATENT APPLICATION

This application claims the benefit of priority to Taiwan Patent Application No. 112104500, filed on Feb. 9, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a temperature measuring device, and more particularly to a temperature measuring device for reducing heat conduction path or heat exchange area when contacting an object to be measured.

BACKGROUND OF THE DISCLOSURE

When a prior temperature measuring device is in contact with an object to be measured, heat exchange will occur between the temperature measuring device and the object to be measured due to mutual contact, thereby affecting the temperature measurement accuracy of the temperature measuring device.

SUMMARY OF THE DISCLOSURE

In response to the above-referenced technical inadequacy, the present disclosure provides a temperature measuring device for reducing the heat conduction path or the heat exchange area when contacting the object to be measured.

In order to solve the above-mentioned problems, one of the technical aspects adopted by the present disclosure is to provide a temperature measuring device, which includes a device main body, a signal control module, a temperature measurement module and an information display module. The device main body has a hollow probe structure. The signal control module is disposed in the device main body. The temperature measurement module is accommodated in the hollow probe structure of the device main body and electrically connected to the signal control module, wherein the temperature measurement module is configured for measuring a predetermined object to obtain temperature information of the predetermined object. The information display module is disposed on the device main body and electrically connected to the signal control module, and the information display module is configured to display the temperature information of the predetermined object obtained by the temperature measurement module. An outer surface of the hollow probe structure of the device main body has a plurality of recessed spaces recessed therefrom and a plurality of concave areas respectively formed in the recessed spaces. When the hollow probe structure of the device main body directly or indirectly contacts the predetermined object, the recessed spaces of the hollow probe structure are configured to reduce a heat conduction path between the hollow probe structure and the predetermined object. When the hollow probe structure of the device main body directly or indirectly contacts the predetermined object, the concave areas of the hollow probe structure do not contact the predetermined object, so as to reduce a heat exchange area between the hollow probe structure and the predetermined object.

In order to solve the above-mentioned problems, another one of the technical aspects adopted by the present disclosure is to provide a temperature measuring device configured for measuring a predetermined object by a temperature measurement module. The temperature measuring device includes a device main body having a hollow probe structure. An outer surface of the hollow probe structure of the device main body has a plurality of recessed spaces recessed therefrom and a plurality of concave areas respectively formed in the recessed spaces. When the hollow probe structure of the device main body directly or indirectly contacts the predetermined object, the recessed spaces of the hollow probe structure are configured to reduce a heat conduction path between the hollow probe structure and the predetermined object. When the hollow probe structure of the device main body directly or indirectly contacts the predetermined object, the concave areas of the hollow probe structure do not contact the predetermined object, so as to reduce a heat exchange area between the hollow probe structure and the predetermined object.

In one of the possible or preferred embodiments, each of the recessed spaces of the hollow probe structure is a transverse annular groove, or the recessed spaces of the hollow probe structure are connected to form a helical groove, and the transverse annular grooves are arranged around a same center line and separated from each other by a predetermined distance.

In one of the possible or preferred embodiments, the recessed spaces at least include a first transverse annular groove and a second transverse annular groove, and a minimum distance from the second transverse annular groove to the center line is greater than a minimum distance from the first transverse annular groove to the center line.

In one of the possible or preferred embodiments, the hollow probe structure includes a first transverse annular structure disposed between an end of the hollow probe structure and the first transverse annular groove, the hollow probe structure includes a second transverse annular structure disposed between the first transverse annular groove and the second transverse annular groove, and a maximum distance from the second transverse annular structure to the center line is greater than a maximum distance from the first transverse annular structure to the center line.

In one of the possible or preferred embodiments, the first transverse annular structure is a first continuous annular body or includes a plurality of first convex bodies separate from each other, and the second transverse annular structure is a second continuous annular body or includes a plurality of second convex bodies separate from each other.

In one of the possible or preferred embodiments, each of the recessed spaces of the hollow probe structure is a longitudinally extending groove, or the recessed spaces of the hollow probe structure are connected to form a helical groove, and the longitudinally extending grooves are arranged around a same center line and separated from each other by a predetermined distance.

In one of the possible or preferred embodiments, each of the longitudinally extending grooves communicates with or is separate from an exposed opening of the hollow probe structure, each of the longitudinally extending grooves extends in a direction away from the exposed opening of the hollow probe structure, and a width of each of the longitudinally extending grooves gradually decreases in the direction away from the exposed opening of the hollow probe structure.

In one of the possible or preferred embodiments, the hollow probe structure includes a plurality of longitudinally extending structures, each of the longitudinally extending structures is connected between two adjacent ones of the longitudinally extending grooves, and each of the longitudinally extending structures includes a first longitudinally extending groove and a second longitudinally extending groove that are connected between two adjacent ones of the longitudinally extending grooves.

Whereby, one of the beneficial effects of the present disclosure is that a temperature measuring device provided by the present disclosure can provide technical solutions including a plurality of recessed spaces recessed from the outer surface of the hollow probe structure and a plurality of concave areas respectively formed in the recessed spaces. Therefore, when the hollow probe structure of the device main body directly or indirectly contacts the predetermined object, the recessed spaces of the hollow probe structure are configured to reduce a heat conduction path between the hollow probe structure and the predetermined object. When the hollow probe structure of the device main body directly or indirectly contacts the predetermined object, the concave areas of the hollow probe structure do not contact the predetermined object, so as to reduce a heat exchange area between the hollow probe structure and the predetermined object.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
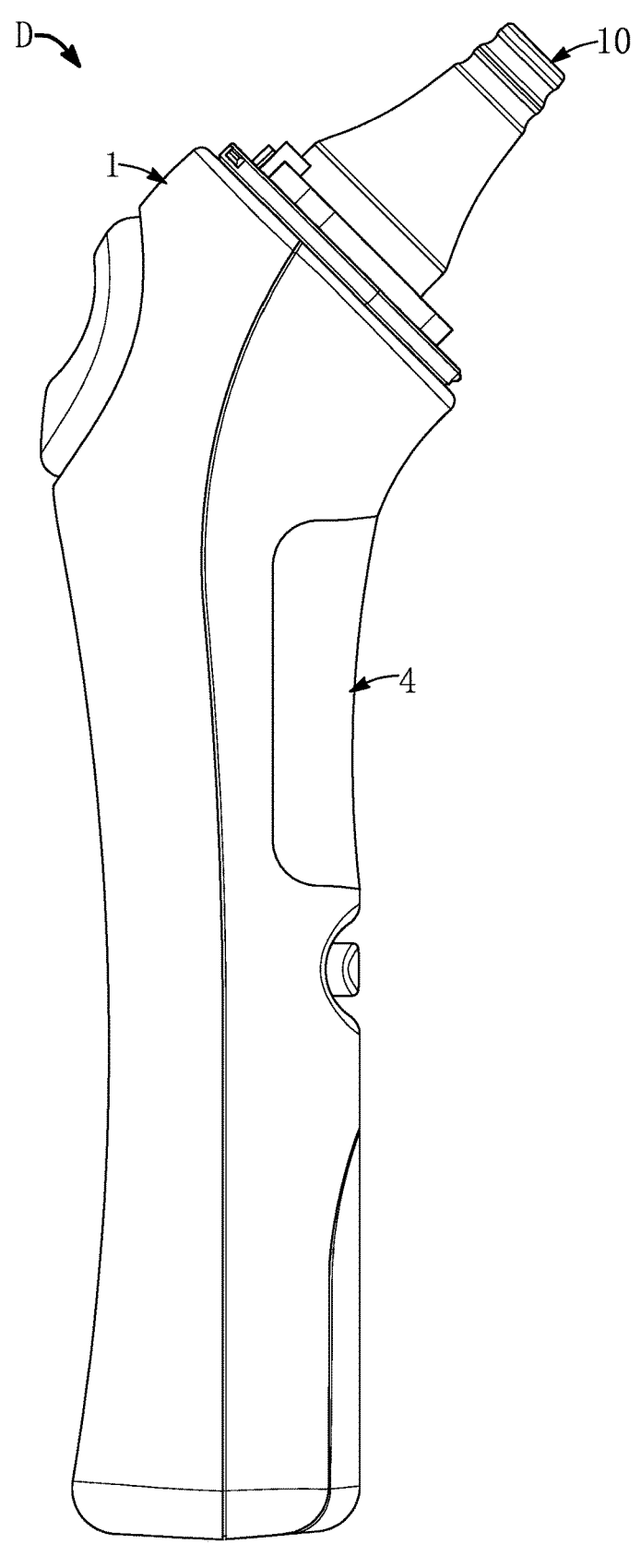
FIG. 1 is a schematic side view of a temperature measuring device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 6, a first embodiment of the present disclosure provides a temperature measuring device D, which includes a device main body 1, a signal control module 2, a temperature measurement module 3 and an information display module 4.

Figure 2:
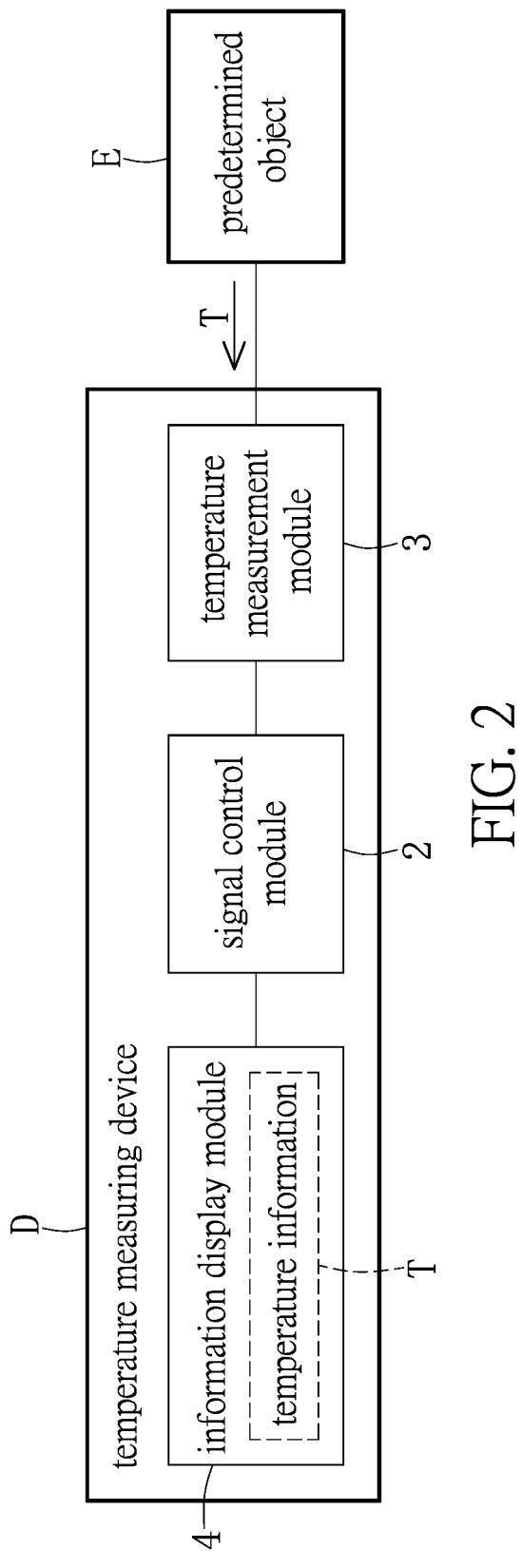
FIG. 2 is a functional block diagram of the temperature measuring device according to the first embodiment of the present disclosure.

More particularly, referring to FIG. 1 and FIG. 2, the device main body 1 has a hollow probe structure 10, and the signal control module 2 is disposed in the device main body 1. Moreover, the temperature measurement module 3 is accommodated in the hollow probe structure 10 of the device main body 1 and electrically connected to the signal control module 2, and the temperature measurement module 3 can be configured for measuring a predetermined object E (i.e., an object under test or an object to be measured, such as human or animal ear canals), so as to obtain temperature information T (such as ear temperature information) of the predetermined object E. Moreover, the information display module 4 is disposed on the device main body 1 and electrically connected to the signal control module 2, and the information display module 4 can be configured to display the temperature information T (such as eardrum temperature information of the ear canal) of the predetermined object E obtained by the temperature measurement module 3. For example, the temperature measurement module 3 can be any kind of infrared temperature sensor, such as a thermopile or a thermistor, and the information display module 4 can be any kind of display. However, the aforementioned details are disclosed for exemplary purposes only, and are not meant to limit the scope of the present disclosure.

Figure 3:
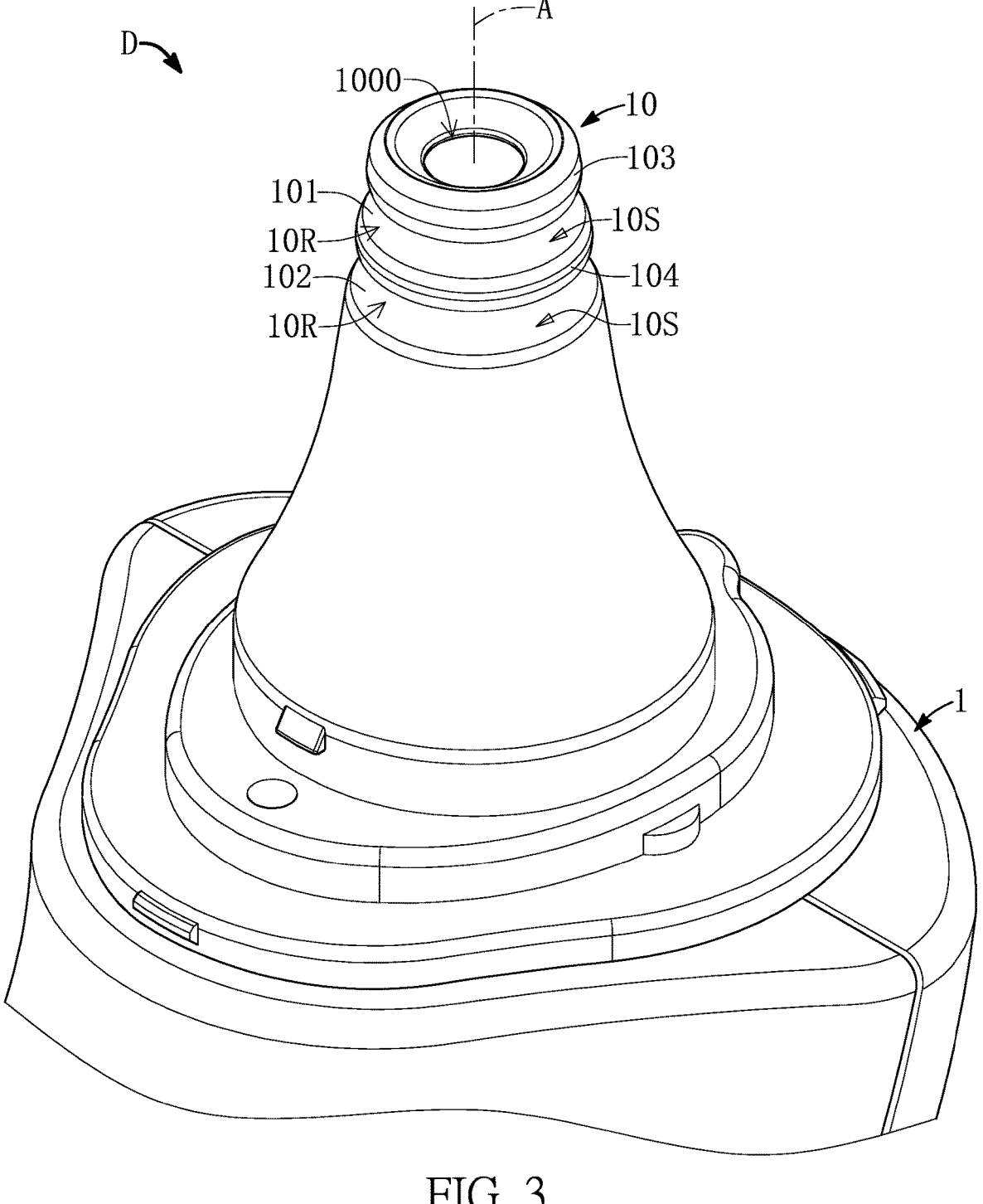
FIG. 3 is a partial perspective schematic view of the temperature measuring device according to the first embodiment of the present disclosure.
Figure 4:
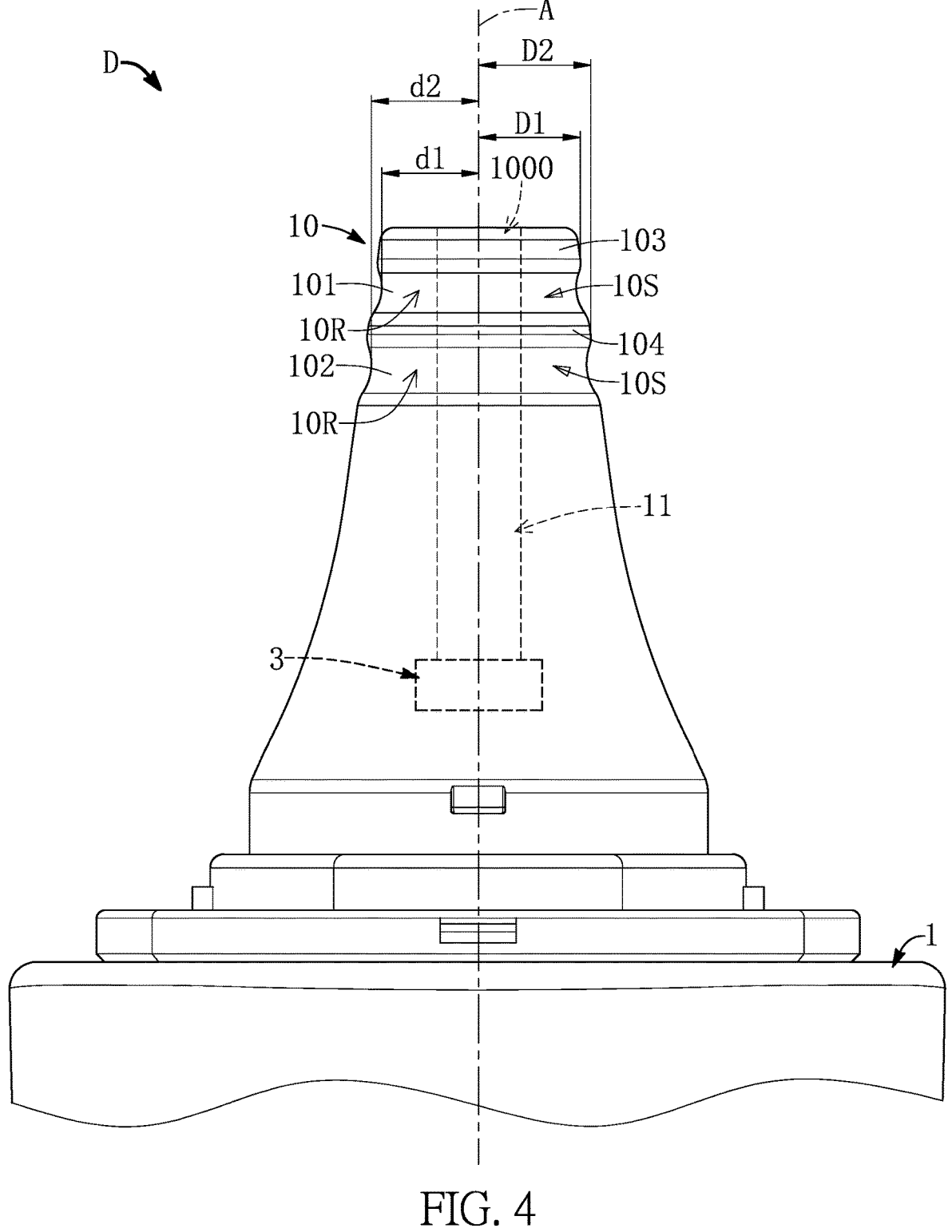
FIG. 4 is a partial schematic side view of the temperature measuring device according to the first embodiment of the present disclosure.
Figure 6:
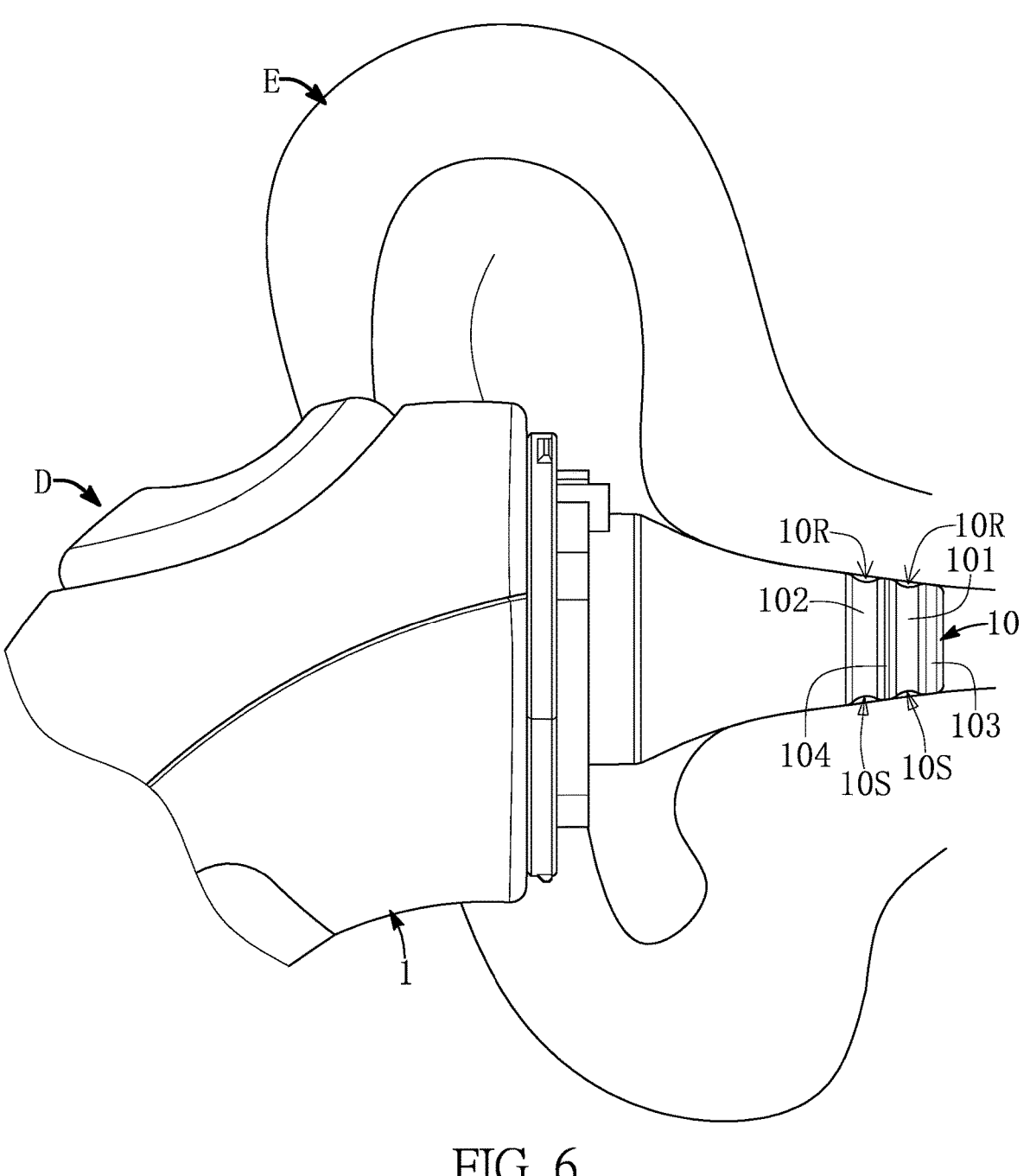
FIG. 6 is a schematic view of the temperature measuring device of the first embodiment of the present disclosure applied to measure a predetermined object.

More particularly, referring to FIG. 3, FIG. 4 and FIG. 6, an outer surface of the hollow probe structure 10 of the device main body 1 has a plurality of recessed spaces 10R recessed from the outer surface of the hollow probe structure 10, and a plurality of concave areas 10S respectively formed in the recessed spaces 10R. For example, under an ambient condition of about 25° C. at room temperature, when the hollow probe structure 10 of the device main body 1 directly contacts the predetermined object E, or indirectly contacts the predetermined object E through the earmuffs (as shown in FIG. 6, when the hollow probe structure 10 of the device main body 1 is inserted into the ear canal with a stable temperature between approximately 34° C. and 37° C.), the recessed spaces 10R of the hollow probe structure 10 can be configured to reduce a heat conduction path between the hollow probe structure 10 and the predetermined object E (such as the ear canal), thereby reducing the cooling problem of the ear canal near the eardrum due to heat exchange (that is to say, the effect of the hollow probe structure 10 on the ear canal close to the eardrum can be reduced), which helps to make the ear temperature measurement of the temperature measuring device D more accurate. In other words, when the hollow probe structure 10 of the device main body 1 directly contacts the predetermined object E, or indirectly contacts the predetermined object E through the earmuffs (as shown in FIG. 6, when the hollow probe structure 10 of the device main body 1 is inserted into the ear canal with a stable temperature between approximately 34° C. and 37° C.), the concave areas 10S of the hollow probe structure 10 do not contact the predetermined object E (such as an inner surface of the ear canal), so as to reduce a heat exchange area between the hollow probe structure 10 and the predetermined object E (such as the ear canal), which helps to make the ear temperature measurement of the temperature measuring device D more accurate. That is to say, since the hollow probe structure 10 of the device main body 1 can provide the recessed spaces 10R or the concave areas 10S, when the hollow probe structure 10 of the device main body 1 is inserted into the ear canal of the predetermined object E, the contact area between the outer surface of the hollow probe structure 10 of the device main body 1 and the inner surface of the ear canal of the predetermined object E can be reduced, thereby effectively reducing the heat conduction path (or the heat exchange area) between the hollow probe structure 10 and the predetermined object E, which will help to reduce the temperature drop of the ear canal near the eardrum due to heat exchange, thereby improving the accuracy of the temperature measuring device D when measuring ear temperature. However, the aforementioned details are disclosed for exemplary purposes only, and are not meant to limit the scope of the present disclosure.

More particularly, referring to FIG. 3 and FIG. 4, the device main body 1 includes a waveguide tube 11 disposed inside the hollow probe structure 10, one opening of the waveguide tube 11 of the hollow probe structure 10 can be close to the temperature measurement module 3, and another opening of the waveguide tube 11 of the hollow probe structure 10 can be away from the temperature measurement module 3 and close to an exposed opening 1000 of the hollow probe structure 10.

More particularly, referring to FIG. 3 and FIG. 4, each of the recessed spaces 10R of the hollow probe structure 10 can be a transverse annular groove, and the transverse annular grooves are arranged around a same center line A and separated from each other by a predetermined distance. For example, the recessed spaces 10R at least include a first transverse annular groove 101 and a second transverse annular groove 102, and a minimum distance d2 from the second transverse annular groove 102 to the center line A is greater than a minimum distance d1 from the first transverse annular groove 101 to the center line A. In addition, the hollow probe structure 10 includes a first transverse annular structure 103 disposed between an end of the hollow probe structure 10 and the first transverse annular groove 101, the hollow probe structure 10 includes a second transverse annular structure 104 disposed between the first transverse annular groove 101 and the second transverse annular groove 102, and a maximum distance D2 from the second transverse annular structure 104 to the center line A is greater than a maximum distance D1 from the first transverse annular structure 103 to the center line A. It is worth mentioning that the first transverse annular structure 103 can be a first continuous annular body (i.e., a first single annular body), and the second transverse annular structure 104 can be a second continuous annular body (i.e., a second single annular body). However, the aforementioned details are disclosed for exemplary purposes only, and are not meant to limit the scope of the present disclosure.

Figure 5:
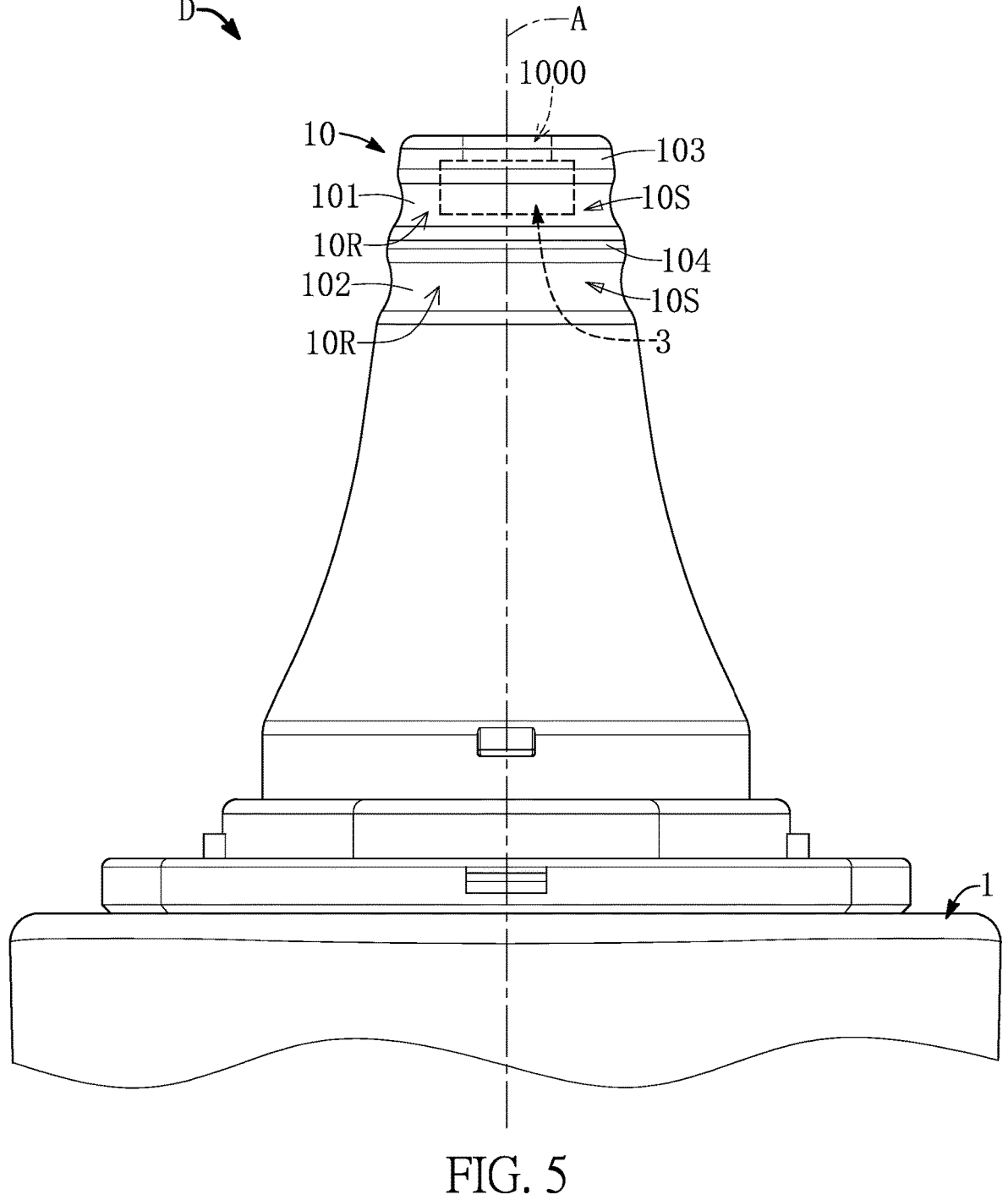
FIG. 5 is a partial schematic side view of the temperature measuring device of another possible implementation of the first embodiment of the present disclosure.

For example, as shown in FIG. 5, in another possible implementation of the first embodiment, the temperature measuring device D can also omit the waveguide tube 11 as shown in FIG. 4. Therefore, in the first embodiment, the hollow probe structure 10 of the device main body 1 may not be equipped with a waveguide tube, so that the position of the temperature measurement module 3 can be very close to the exposed opening 1000 of the hollow probe structure 10. However, the aforementioned details are disclosed for exemplary purposes only, and are not meant to limit the scope of the present disclosure.

Therefore, as shown in FIG. 6, when the temperature measuring device D is used to measure the predetermined object E (such as being used to measure the user's ear temperature), the heat conduction path (or the heat exchange area) between the hollow probe structure 10 and the predetermined object E is reduced through the recessed spaces 10R or the concave areas 10S, so that the hollow probe structure 10 of the temperature measuring device D provided by the present disclosure can be provided with a good measurement accuracy without preheating (that is to say, the hollow probe structure 10 of the temperature measuring device D provided by the present disclosure does not need to be preheated, and will not be affected by the heat conduction with the predetermined object E to cause the temperature of the ear canal to drop). It is worth noting that the hollow probe structure 10 can also be covered with a probe protective cover (i.e., an earmuff, not shown), so that the hollow probe structure 10 of the device main body 1 can indirectly contact the predetermined object E to be measured. However, due to the very thin thickness of the probe protective cover, the probe protective cover cannot effectively reduce the heat conduction path (or the heat exchange area) between the hollow probe structure 10 and the predetermined object E to be measured. That is to say, the use of the probe protective cover will not have a very large impact on the heat conduction path (or the heat exchange area) between the hollow probe structure 10 and the predetermined object E, so that when heat exchange occurs between the hollow probe structure 10 and the predetermined object E, the use of the probe protective cover can be ignored in the present disclosure.

Second Embodiment

Figure 7:
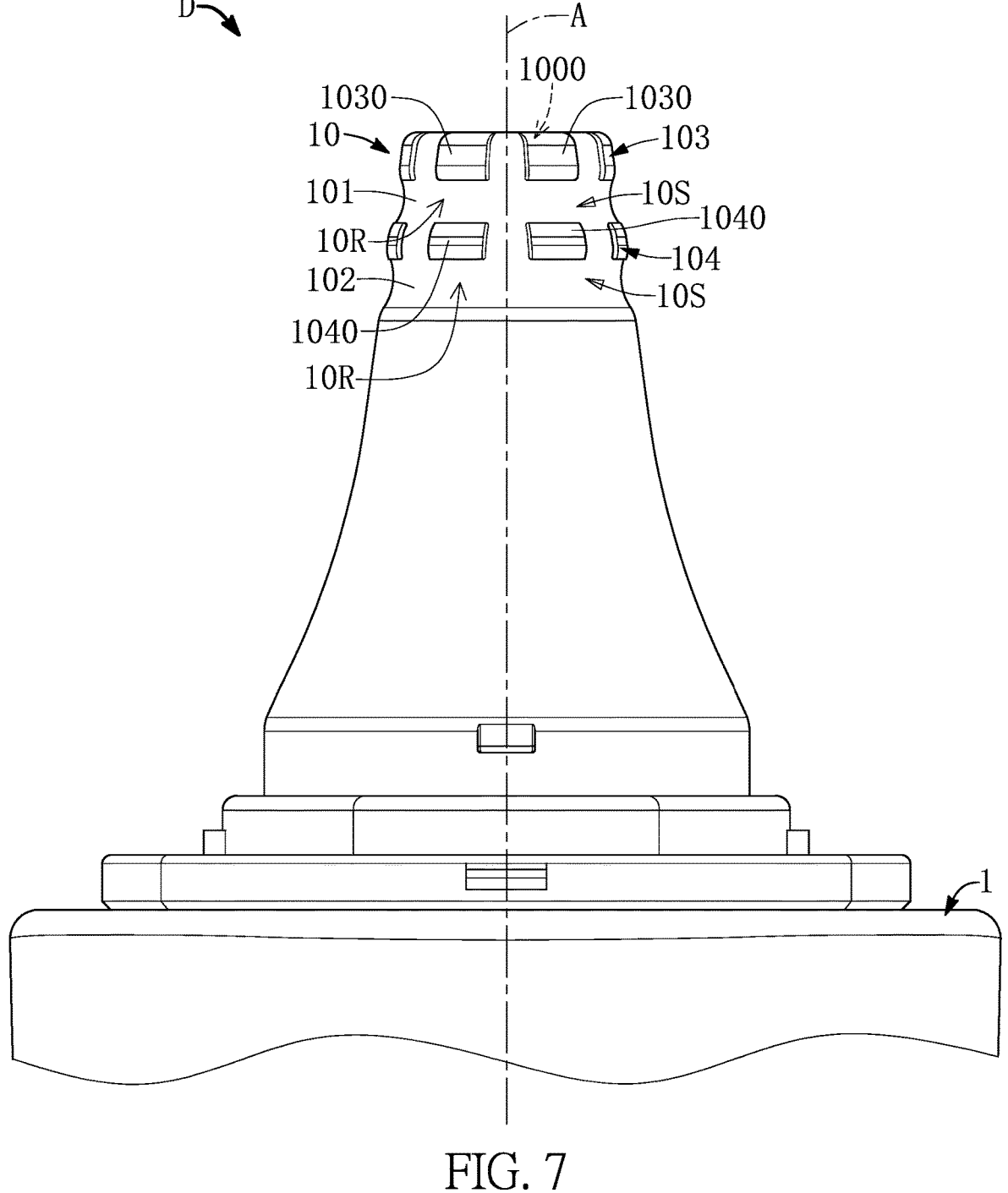
FIG. 7 is a partial schematic side view of the temperature measuring device according to a second embodiment of the present disclosure.

Referring to FIG. 7, a second embodiment of the present disclosure provides a temperature measuring device D, which includes a device main body 1, a signal control module (not shown), a temperature measurement module (not shown) and an information display module (not shown). Comparing FIG. 7 with FIG. 4 (or FIG. 5), the main difference between the second embodiment and the first embodiment is as follows: in the second embodiment, the first transverse annular structure 103 includes a plurality of first convex bodies 1030 separate from each other (that is to say, the first continuous annular body provided by the first embodiment is separated by a plurality of grooves to form the first convex bodies 1030), and the second transverse annular structure 104 includes a plurality of second convex bodies 1040 separate from each other (that is to say, the second continuous annular body provided by the first embodiment is separated by a plurality of grooves to form the second convex bodies 1040).

Therefore, according to different requirements, the first transverse annular structure 103 can be a first continuous annular body (as shown in the first embodiment) or include a plurality of first convex bodies 1030 separate from each other (as shown in the second embodiment), and the second transverse annular structure 104 can be a second continuous annular body (as shown in the first embodiment) or include a plurality of second convex bodies 1040 separate from each other (as shown in the second embodiment). However, the aforementioned details are disclosed for exemplary purposes only, and are not meant to limit the scope of the present disclosure.

Third Embodiment

Figure 8:
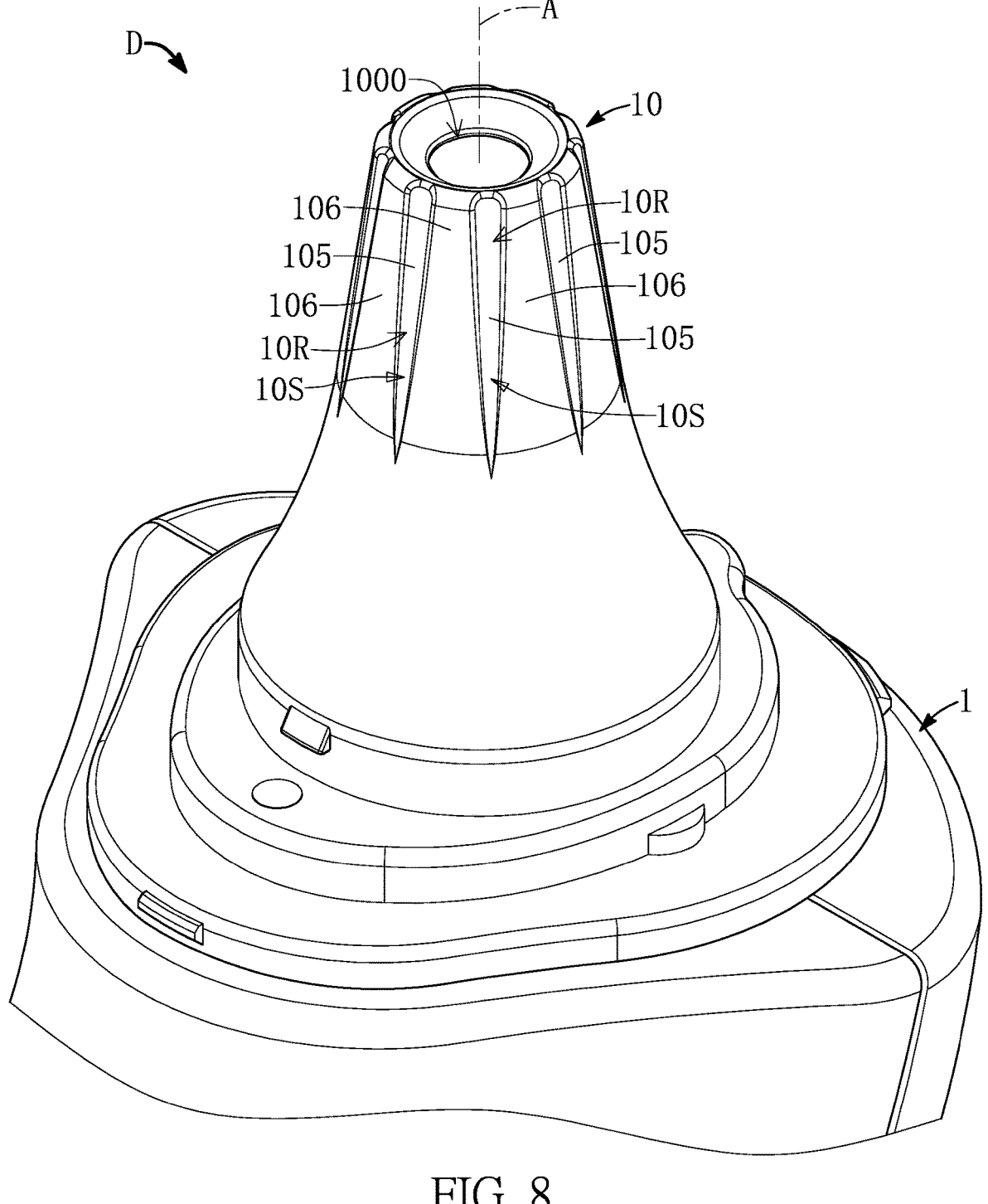
FIG. 8 is a partial perspective schematic view of the temperature measuring device according to a third embodiment of the present disclosure.
Figure 9:
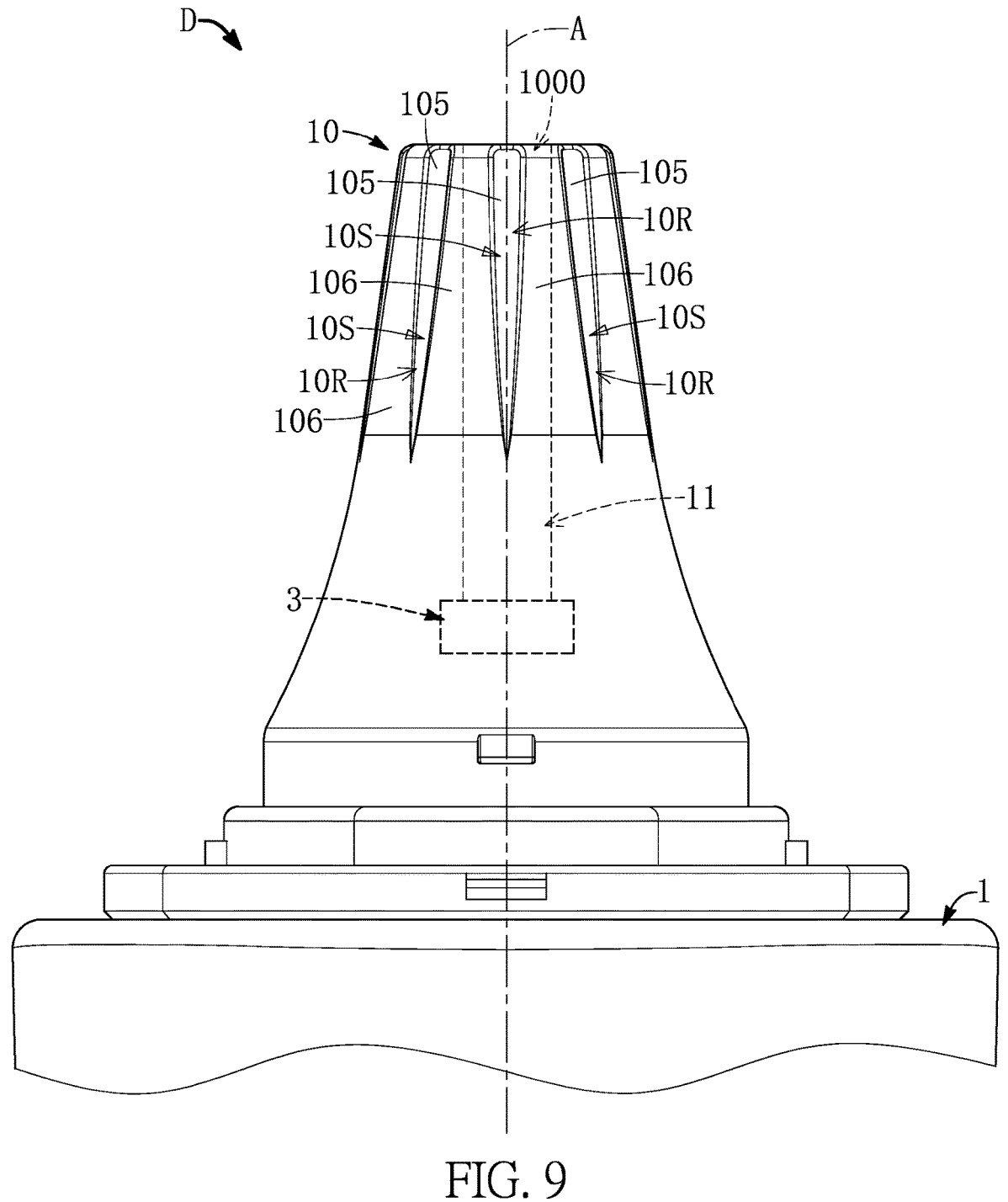
FIG. 9 is a partial schematic side view of the temperature measuring device according to the third embodiment of the present disclosure.
Figure 10:
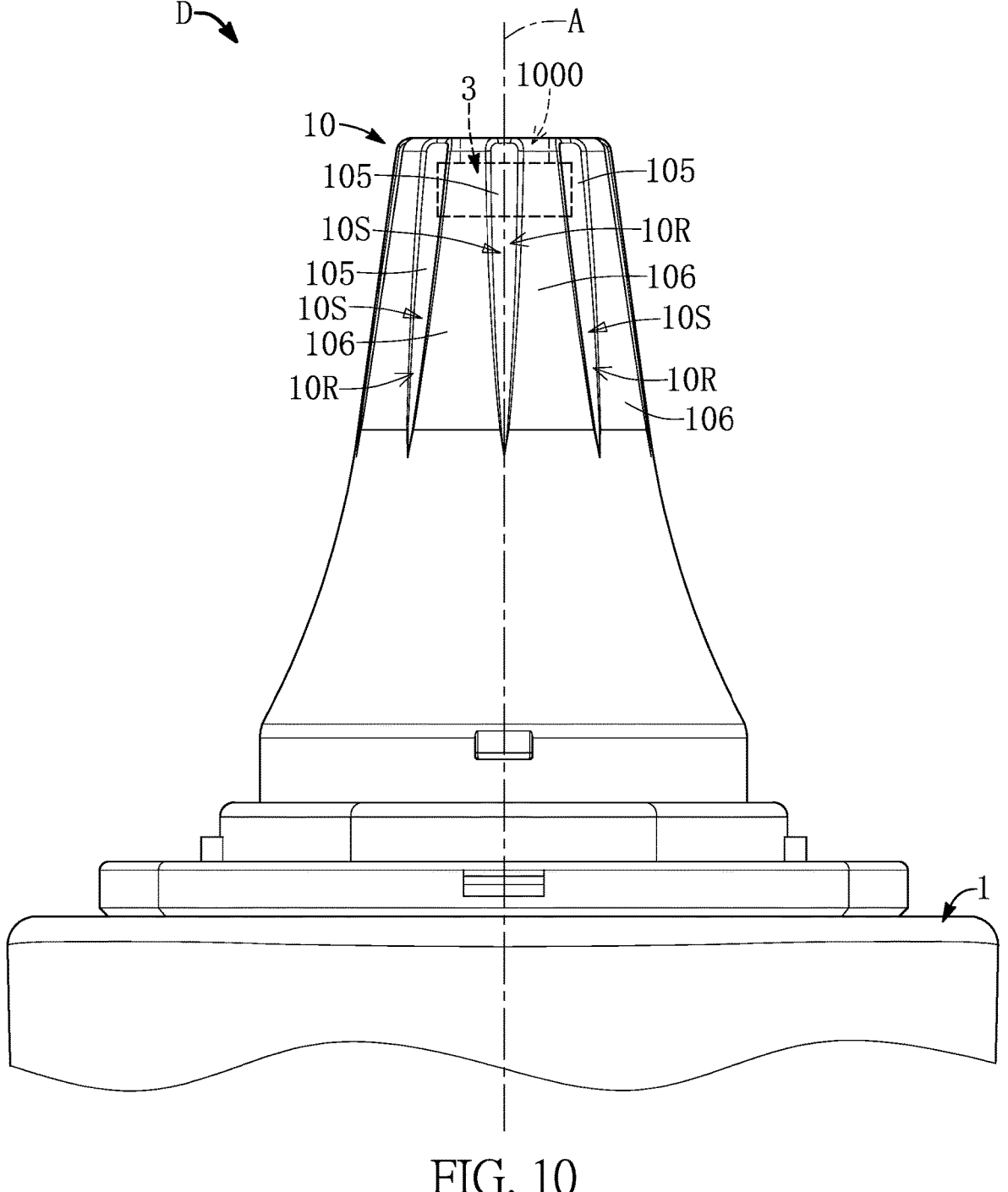
FIG. 10 is a partial schematic side view of another possible implementation of the temperature measuring device of the third embodiment of the present disclosure.

Referring to FIG. 8 to FIG. 10, a third embodiment of the present disclosure provides a temperature measuring device D, which includes a device main body 1, a signal control module (not shown), a temperature measurement module 3 and an information display module (not shown). Comparing FIG. 8 to FIG. 10 with FIG. 3 to FIG. 5 respectively, the main difference between the third embodiment and the first embodiment is as follows: in the third embodiment, each of the recessed spaces 10R of the hollow probe structure 10 is a longitudinally extending groove 105, and the longitudinally extending grooves 105 can be arranged around a same center line A and separated from each other by a predetermined distance.

More particularly, referring to FIG. 8 and FIG. 9, each of the longitudinally extending grooves 105 can communicate with the exposed opening 1000 of the hollow probe structure 10 (as shown in FIG. 8 and FIG. 9), or each of the longitudinally extending grooves 105 can be separate from the exposed opening 1000 of the hollow probe structure 10 (i.e., disconnected with the exposed opening 1000 of the hollow probe structure 10). Moreover, each of the longitudinally extending grooves 105 can extend in a direction (i.e., a longitudinal direction) away from the exposed opening 1000 of the hollow probe structure 10, and a width of each of the longitudinally extending grooves 105 can gradually decrease in the direction (i.e., a longitudinal direction) away from the exposed opening 1000 of the hollow probe structure 10. In addition, the hollow probe structure 10 includes a plurality of longitudinally extending structures 106, and each of the longitudinally extending structures 106 is connected between two adjacent ones of the longitudinally extending grooves 105 (that is to say, the longitudinally extending grooves 105 and the longitudinally extending structures 106 are arranged around the center line A in an alternate manner).

For example, as shown in FIG. 10, in another possible implementation of the third embodiment, the temperature measuring device D can also omit the waveguide tube 11 as shown in FIG. 9. Therefore, in the third embodiment, the hollow probe structure 10 of the device main body 1 may not be equipped with a waveguide tube, so that the position of the temperature measurement module 3 can be very close to the exposed opening 1000 of the hollow probe structure 10. However, the aforementioned details are disclosed for exemplary purposes only, and are not meant to limit the scope of the present disclosure.

Fourth Embodiment

Figure 11:
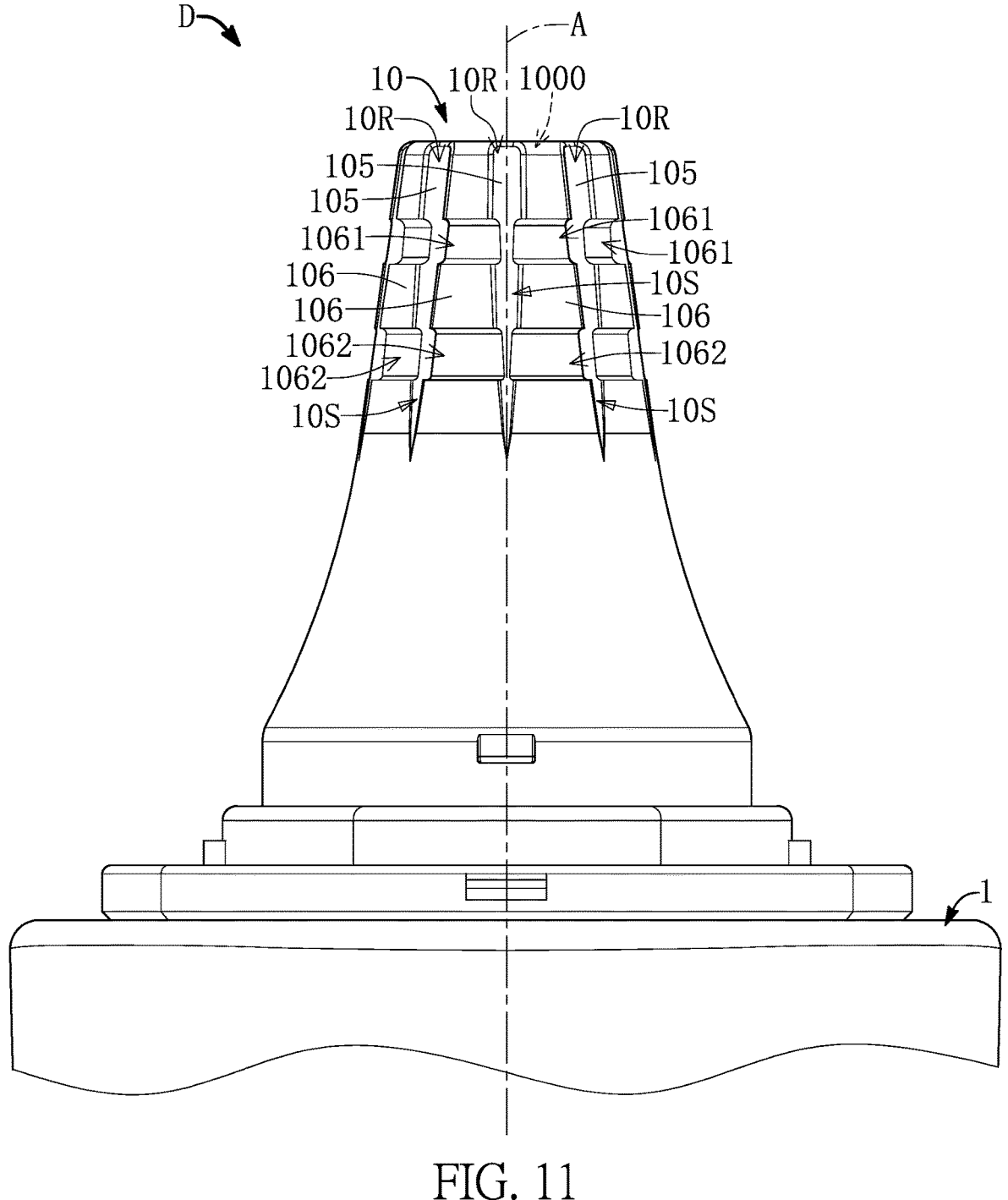
FIG. 11 is a partial schematic side view of the temperature measuring device according to a fourth embodiment of the present disclosure.

Referring to FIG. 11, a fourth embodiment of the present disclosure provides a temperature measuring device D, which includes a device main body 1, a signal control module (not shown), a temperature measurement module (not shown) and an information display module (not shown). Comparing FIG. 11 with FIG. 9 (or FIG. 10), the main difference between the fourth embodiment and the third embodiment is as follows: in the fourth embodiment, each of the longitudinally extending structures 106 includes a first longitudinally extending groove 1061 and a second longitudinally extending groove 1062 that are connected between two adjacent ones of the longitudinally extending grooves 105.

Therefore, according to different requirements, each longitudinally extending structure 106 may be a continuous longitudinally extending structure (as shown in the third embodiment) or a discontinuous longitudinally extending structure having a first longitudinally extending groove 1061 and a second longitudinally extending groove 1062 (as shown in the fourth embodiment). However, the aforementioned details are disclosed for exemplary purposes only, and are not meant to limit the scope of the present disclosure.

Fifth Embodiment

Figure 12:
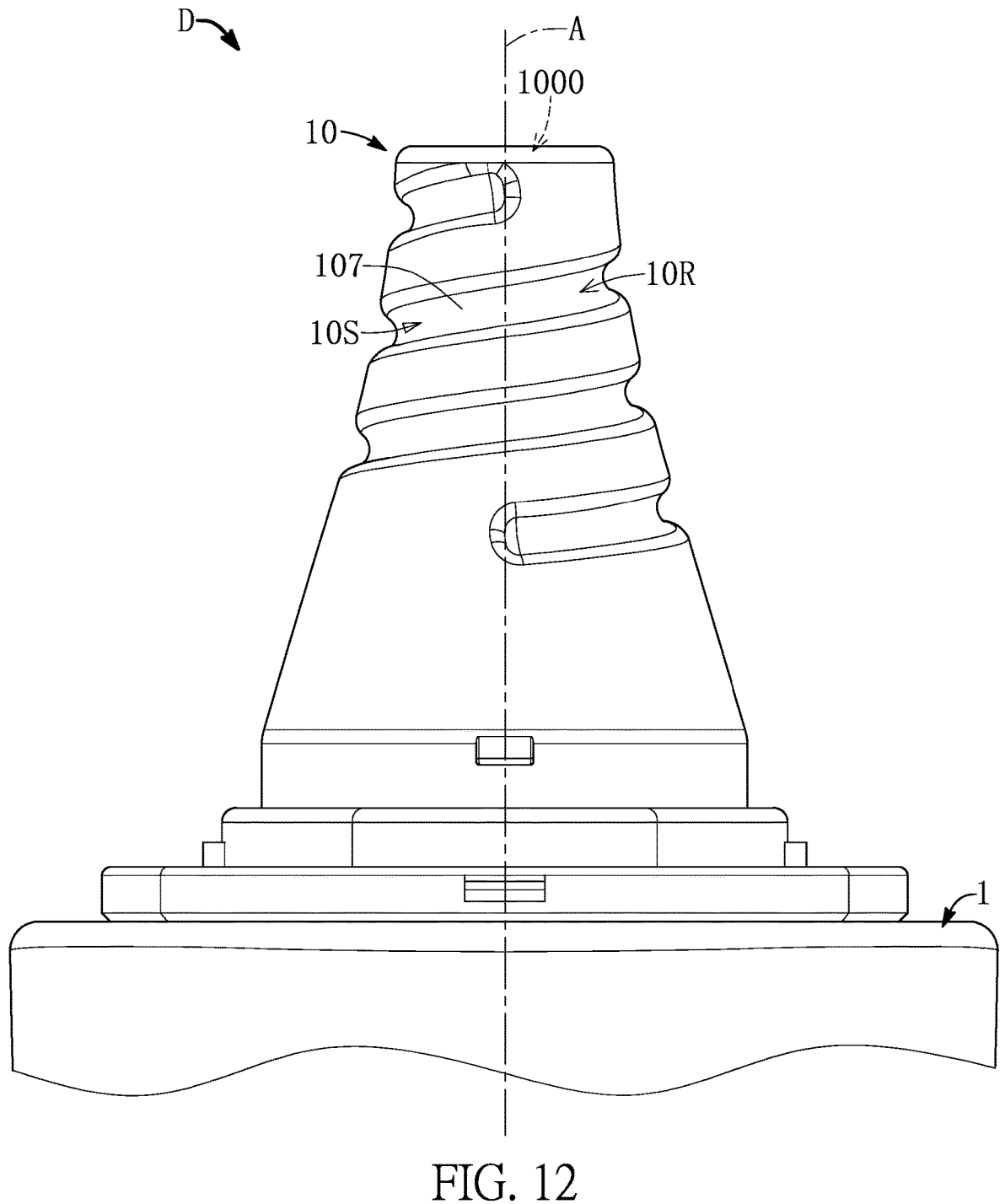
FIG. 12 is a partial schematic side view of the temperature measuring device according to a fifth embodiment of the present disclosure.

Referring to FIG. 12, a fifth embodiment of the present disclosure provides a temperature measuring device D, which includes a device main body 1, a signal control module (not shown), a temperature measurement module (not shown) and an information display module (not shown). Comparing FIG. 12 with FIG. 4 (or FIG. 5), the main difference between the fifth embodiment and the first embodiment is as follows: in the fifth embodiment, the recessed spaces 10R of the hollow probe structure 10 are connected to form a helical groove 107.

Beneficial Effects of the Embodiments

In conclusion, one of the beneficial effects of the present disclosure is that a temperature measuring device D provided by the present disclosure can provide technical solutions including a plurality of recessed spaces 10R recessed from the outer surface of the hollow probe structure 10 and a plurality of concave areas 10S respectively formed in the recessed spaces 10R. Therefore, under an ambient condition of about 25° C. at room temperature, when the hollow probe structure 10 of the device main body 1 directly or indirectly contacts the predetermined object E (having a stable temperature between approximately 34° C. and 37° C.), the recessed spaces 10R of the hollow probe structure 10 can be configured to reduce a heat conduction path between the hollow probe structure 10 and the predetermined object E (such as the ear canal); or when the hollow probe structure 10 of the device main body 1 directly or indirectly contacts the predetermined object E (having a stable temperature between approximately 34° C. and 37° C.), the concave areas 10S of the hollow probe structure 10 do not contact the predetermined object E, so as to reduce a heat exchange area between the hollow probe structure 10 and the predetermined object E, thereby reducing the cooling problem of the ear canal near the eardrum due to heat exchange, which helps to make the ear temperature measurement of the temperature measuring device D more accurate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A temperature measuring device, comprising:
a device main body having a hollow probe structure;
a signal control module disposed in the device main body;
a temperature measurement module accommodated in the hollow probe structure of the device main body and electrically connected to the signal control module, wherein the temperature measurement module is configured for measuring a predetermined object to obtain temperature information of the predetermined object; and
an information display module disposed on the device main body and electrically connected to the signal control module, wherein the information display module is configured to display the temperature information of the predetermined object obtained by the temperature measurement module;
wherein an outer surface of the hollow probe structure of the device main body has a plurality of recessed spaces recessed therefrom and a plurality of concave areas respectively formed in the recessed spaces;
wherein, when the hollow probe structure of the device main body directly or indirectly contacts the predetermined object, the recessed spaces of the hollow probe structure are configured to reduce a heat conduction path between the hollow probe structure and the predetermined object;
wherein, when the hollow probe structure of the device main body directly or indirectly contacts the predetermined object, the concave areas of the hollow probe structure do not contact the predetermined object, so as to reduce a heat exchange area between the hollow probe structure and the predetermined object; and
wherein each of the recessed spaces of the hollow probe structure is a transverse annular groove, and the transverse annular grooves are arranged around a same center line and separated from each other by a predetermined distance.

2. The temperature measuring device according to claim 1, wherein the recessed spaces at least include a first transverse annular groove and a second transverse annular groove, and a minimum distance from the second transverse annular groove to the center line is greater than a minimum distance from the first transverse annular groove to the center line.

3. The temperature measuring device according to claim 2, wherein the hollow probe structure includes a first transverse annular structure disposed between an end of the hollow probe structure and the first transverse annular groove, the hollow probe structure includes a second transverse annular structure disposed between the first transverse annular groove and the second transverse annular groove, and a maximum distance from the second transverse annular structure to the center line is greater than a maximum distance from the first transverse annular structure to the center line.

4. The temperature measuring device according to claim 3, wherein the first transverse annular structure is a first continuous annular body or includes a plurality of first convex bodies separate from each other, and the second transverse annular structure is a second continuous annular body or includes a plurality of second convex bodies separate from each other.

5. The temperature measuring device according to claim 1, wherein each of the recessed spaces of the hollow probe structure is a longitudinally extending groove, and the longitudinally extending grooves are arranged around a same center line and separated from each other by a predetermined distance.

6. The temperature measuring device according to claim 5, wherein each of the longitudinally extending grooves communicates with or is separate from an exposed opening of the hollow probe structure, each of the longitudinally extending grooves extends in a direction away from the exposed opening of the hollow probe structure, and a width of each of the longitudinally extending grooves gradually decreases in the direction away from the exposed opening of the hollow probe structure.

7. The temperature measuring device according to claim 6, wherein the hollow probe structure includes a plurality of longitudinally extending structures, each of the longitudinally extending structures is connected between two adjacent ones of the longitudinally extending grooves, and each of the longitudinally extending structures includes a first longitudinally extending groove and a second longitudinally extending groove that are connected between two adjacent ones of the longitudinally extending grooves.

8. A temperature measuring device configured for measuring a predetermined object by a temperature measurement module, the temperature measuring device comprising:
a device main body having a hollow probe structure;
wherein an outer surface of the hollow probe structure of the device main body has a plurality of recessed spaces recessed therefrom and a plurality of concave areas respectively formed in the recessed spaces;
wherein, when the hollow probe structure of the device main body directly or indirectly contacts the predetermined object, the recessed spaces of the hollow probe structure are configured to reduce a heat conduction path between the hollow probe structure and the predetermined object;

wherein, when the hollow probe structure of the device main body directly or indirectly contacts the predetermined object, the concave areas of the hollow probe structure do not contact the predetermined object, so as to reduce a heat exchange area between the hollow probe structure and the predetermined object; and wherein the recessed spaces of the hollow probe structure are connected to form a helical groove.

9. The temperature measuring device according to claim 8, wherein each of the recessed spaces of the hollow probe structure is a longitudinally extending groove, and the longitudinally extending grooves are arranged around a same center line and separated from each other by a predetermined distance.

10. The temperature measuring device according to claim 9, wherein each of the longitudinally extending grooves communicates with or is separate from an exposed opening of the hollow probe structure, each of the longitudinally extending grooves extends in a direction away from the exposed opening of the hollow probe structure, and a width of each of the longitudinally extending grooves gradually decreases in the direction away from the exposed opening of the hollow probe structure.

11. The temperature measuring device according to claim 10, wherein the hollow probe structure includes a plurality of longitudinally extending structures, each of the longitudinally extending structures is connected between two adjacent ones of the longitudinally extending grooves, and each of the longitudinally extending structures includes a first longitudinally extending groove and a second longitudinally extending groove that are connected between two adjacent ones of the longitudinally extending grooves.

*  *  *  *  *